(12) United States Patent
Yang et al.

(10) Patent No.: US 8,792,065 B2
(45) Date of Patent: Jul. 29, 2014

(54) SUB-PIXEL DISPLAY STRUCTURE AND LIQUID CRYSTAL DISPLAY PANEL USING THE SAME

(75) Inventors: Zan Yang, Guangdong (CN); Chih-Wen Chen, Guangdong (CN); Chia-chiang Hsiao, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 36 days.

(21) Appl. No.: 13/638,915

(22) PCT Filed: Aug. 8, 2012

(86) PCT No.: PCT/CN2012/079799
§ 371 (c)(1),
(2), (4) Date: Oct. 1, 2012

(87) PCT Pub. No.: WO2014/012280
PCT Pub. Date: Jan. 23, 2014

(65) Prior Publication Data
US 2014/0022470 A1      Jan. 23, 2014

(30) Foreign Application Priority Data
Jul. 18, 2012   (CN) .......................... 2012 1 0248619

(51) Int. Cl.
*G02F 1/136* (2006.01)
*G02F 1/1343* (2006.01)
*G02F 1/1333* (2006.01)
*G02F 1/1362* (2006.01)

(52) U.S. Cl.
CPC .................................. *G02F 1/13624* (2013.01)
USPC ................. 349/48; 349/38; 349/85; 349/129; 349/144

(58) Field of Classification Search
CPC ................ G02F 2203/30; G02F 2001/134345; G02F 2001/134354; G02F 1/136213; G02F 1/13624
USPC ................................ 349/38, 85, 144, 48, 129
See application file for complete search history.

(56) References Cited

U.S. PATENT DOCUMENTS

| | | | |
|---|---|---|---|
| 2010/0289975 A1* | 11/2010 | Nakagawa | 349/33 |
| 2011/0221744 A1* | 9/2011 | Bae et al. | 345/419 |
| 2013/0002625 A1* | 1/2013 | Liao et al. | 345/205 |

* cited by examiner

*Primary Examiner* — Nathanael R Briggs
(74) *Attorney, Agent, or Firm* — Kirton McConkie; Evan R. Witt

(57) ABSTRACT

The present invention discloses a sub-pixel display structure and a liquid crystal display panel using the same. The sub-pixel display structure includes two electrode portions. One of the electrode portions can perform charge-sharing via a charge-sharing switch. At least one of the two electrode portions is further connected to an extra electrode portion. When being used in a 3D liquid crystal display panel having a patterned phase retarder film, the sub-pixel display structure can satisfy the requirement of 3D view angle by making the extra electrode portion to be shielded by black matrix, and the two electrode portions still remain operatable so that a color washout phenomenon under a large viewing angle can be reduced even in a 3D liquid crystal display panel.

12 Claims, 9 Drawing Sheets

SUB-PIXEL DISPLAY STRUCTURE AND LIQUID CRYSTAL DISPLAY PANEL USING THE SAME

BACKGROUND OF THE INVENTION

1. Field of the Invention

The present invention relates to liquid crystal display technology, especially to a sub-pixel display structure which improves color washout phenomenon in 2D display and 3D display, and a liquid crystal display panel using the sub-pixel display structure.

2. Description of the Related Art

Nowadays the liquid crystal display device manufacturer can produce liquid crystal display devices having a size larger than 50 inches. However, large size thin-film transistor liquid crystal display device has an obvious problem with viewing angle, that is, when a user watch the screen of the device from different angles, there are differences in brightness and contrast of the screen. In order to improve the problem of the thin-film transistor LCD with viewing angle, manufacturers has proposed various technologies of wide viewing angle, such as multi-domain vertical alignment (MVA) technology, which effectively increase the viewing angle of the display device. However, although the MVA technology can increase the viewing angle, for a large-sized liquid crystal panel, a problem of color washout will occur at a large viewing angle.

In order to solve the color washout problem, a conventional solution is disclosed in FIG. 1. FIG. 1 is a schematic view of a sub-pixel display structure of a conventional liquid crystal display panel. The sub-pixel display structure includes a first portion 91, a second portion 92, a first scanning line 93, a second scanning line 94, a data line 95, a primary switch unit 96 and a charge-sharing switch 97. The first portion 91 has four liquid crystal domains with different liquid crystal pretilt angles. The second portion 92 also has four liquid crystal domains with different liquid crystal pretilt angles. The first portion 91 and the second portion 92 are disposed between the first scanning line 93 and the second scanning line 94. The first scanning line 93 can switch on the primary switch unit 96 that is correspondingly connected to the first portion 91 and the second portion 92 so that a liquid crystal capacitor in the first portion 91 and a liquid crystal capacitor in the second portion 92 can receive a gray scale voltage from the data line 95 via the primary switch unit 96; the scanning line 94 then switches on the charge-sharing switch 97 so that the liquid crystal capacitor in the second portion 92 further shares electric charges with a voltage-dividing capacitor via the charge-sharing switch. Hence, the liquid crystal capacitor in the first portion 91 and the liquid crystal capacitor in the second portion 92 have different gray scale voltage and thereby have different transmittance and then further improve the color washout phenomenon.

Another solution is disclosed in FIG. 2. The sub-pixel display structure in FIG. 2 includes a first portion 81, a second portion 82, a first data line 83, a second data line 84, a scanning line 85 and a primary switch unit 86. The primary switch unit 86 and the scanning line 85 is disposed between the first portion 81 and the second portion 82. The primary switch unit 86 is connected to the first data line 83 and the second data line 84 and is composed of at least two switches. The scanning line 85 can switch on the primary switch unit 86 so that the first data line 83 and the second data line 84 can transmit different gray scale voltages via the primary switch unit to a liquid crystal capacitor in the first portion 81 and a liquid crystal capacitor in the second portion 82, respectively. In this way, the first portion 81 and the second portion 82 can also have different transmittance to further reduce color washout phenomenon under large viewing angles.

With the development of liquid crystal display technology, manufacturers also develop liquid crystal display panels providing 3D display function, such as a liquid crystal display panel using a patterned phase retarder film can have a 3D display function. However, when the sub-pixel structure in FIG. 1 or in FIG. 2 is adopted in the liquid crystal display panel having a patterned phase retarder film, an interval between a sub-pixel structure for displaying left-eye images and a sub-pixel structure for displaying right-eye images must be widened so as to avoid image crosstalk. Thus, the sub-pixel structure in FIG. 1 or in FIG. 2 has to partially dispose black matrix on the pixel portions or switch off the display function of one of the pixel portions (so as to act as a black matrix) to satisfy the requirement of 3D viewing angle and thereby causing the liquid crystal display panel to be unable to solve the color washout problem under 3D display.

Therefore, some manufacturers further disclose a sub-pixel display structure as shown in FIG. 3. The sub-pixel display structure includes a first portions 71, a second portion 72, a third portion 73, a first data line 74, a second data line 75, a first scanning line 76, a second scanning line 77, a primary switch unit 78 and a charge-sharing switch 79. The first scanning line 76 and the primary switch unit 78 are disposed between the first portion 71 and the second portion 72. The primary switch unit 78 is composed of three switches. The first scanning line 76 can switch on the primary switch unit 78 to further make the liquid crystal capacitor in the first portion 71 to receive a gray scale voltage inputted by the second data line 75 and make the liquid crystal capacitors in the second portion 72 and the third portion 73 to receive a gray scale voltage inputted by the first data line 74. Since the first date line 74 and the second data line 75 transmit different gray scale voltages, the first portion 71 and the second portion 72 or the third portion 73 can have different transmittance to further improve color washout at large viewing angles under 2D display. Besides, under 3D display, the first portion 71 can be switched off to act as a black matrix so as to satisfy the requirement of 3D viewing angle; in the meantime, the second scanning line 77 can switch on the charge-sharing switch 79 such that the liquid crystal capacitor in the third portion 73 further shares electric charges with a voltage-dividing capacitor via the charge-sharing switch 79. In this way the liquid crystal capacitor in the second portion 72 and the liquid crystal capacitor in the third portion 73 can respectively have different gray scale voltages to have different transmittance. Hence, the liquid crystal display panel can still reduce the color washout phenomenon at large viewing angles under 3D display.

However, the sub-pixel display structure in FIG. 3 has to use two data lines at the same time, and since the manufacturing cost and power consumption of a data driving chip (also called source driving chip) is relatively higher, the sub-pixel display structure in FIG. 3 will relatively increase the manufacturing cost and power consumption of the liquid crystal display device.

Therefore, it is necessary to provide a sub-pixel display structure and an inspection method using the same to overcome the problems existing in the conventional technology.

SUMMARY OF THE INVENTION

In view of the shortcomings of the conventional technology, the main objective of the invention is to provide a sub-pixel display structure and a liquid crystal display panel using the same, the sub-pixel display structure can improve color washout phenomenon no matter in a 2D liquid crystal display panel or in a 3D liquid crystal display panel using a patterned phase retarder film.

In order to achieve the foregoing object of the present invention, the present invention provides a sub-pixel display structure; the sub-pixel display structure is electrically connected to a first data line, a first scanning line and a second scanning line adjacent to the first scanning line, and comprises:

a primary switch unit being electrically connected to the first scanning line and the first data line, and the primary switch unit is driven by the first scanning line;

a charge-sharing switch being electrically connected to the second scanning line, and the charge-sharing switch is driven by the second scanning line;

a first electrode portion being electrically connected to the primary switch unit, and the first electrode portion receives a gray scale voltage transmitted by the first data line when the primary switch unit is switched on; and a second electrode portion being electrically connected to the primary switch unit and the charge-sharing switch, wherein the second electrode portion receives the gray scale voltage transmitted by the first data line when the primary switch unit is switched on; the second electrode portion further shares electric charges with a voltage-dividing capacitor when the charge-sharing switch is switched on so as to change the gray scale voltage in the second electrode portion;

wherein at least one of the first electrode portion and the second electrode portion is connected to an extra electrode portion; and each of the first electrode portion, the second electrode portion and the extra electrode portion corresponds to four liquid crystal domains with different liquid crystal pretilt angles.

In one embodiment of the present invention, the first electrode portion, the second electrode portion and the extra electrode portion are disposed between the first scanning line and the second scanning line.

In one embodiment of the present invention, the first electrode portion is connected to an extra electrode portion and electrically connected to the primary switch unit via the extra electrode portion.

In one embodiment of the present invention, the second electrode portion is connected to an extra electrode portion and electrically connected to the charge-sharing switch via the extra electrode portion.

In one embodiment of the present invention, the first electrode portion is connected to a first extra electrode portion and electrically connected to the primary switch unit via the first extra electrode portion; and the second electrode portion is connected to a second extra electrode portion and electrically connected to the charge-sharing switch via the second extra electrode portion.

In one embodiment of the present invention, each of the first electrode portion, the second electrode portion, the first extra electrode portion and the second extra electrode portion corresponds to four liquid crystal domains with different liquid crystal pretilt angles.

In one embodiment of the present invention, the ratio of areas of the first electrode portion and the second electrode portion is 3:7 or 4:6.

In one embodiment of the present invention, the primary switch unit is composed of two switches; the first electrode portion is electrically connected to one of the switches of the primary switch unit; and the second electrode portion is electrically connected to the other one of the switches of the primary switch unit.

The present invention further provides a liquid crystal display panel comprising:

a plurality of scanning lines including a first scanning line and a second scanning line that are adjacent to each other;

a plurality of data lines crossing the scanning lines and including a first data line;

a plurality of sub-pixel display structures, wherein one of the sub-pixel display structures is electrically connected to the first data line, the first scanning line and the second scanning line adjacent to the first scanning line, and comprises:

a primary switch unit being electrically connected to the first scanning line and the first data line, and the primary switch unit is driven by the first scanning line;

a charge-sharing switch being electrically connected to the second scanning line, and the charge-sharing switch is driven by the second scanning line;

a first electrode portion being electrically connected to the primary switch unit, and the first electrode portion receives a gray scale voltage transmitted by the first data line when the primary switch unit is switched on; and a second electrode portion being electrically connected to the primary switch unit and the charge-sharing switch, wherein the second electrode portion receives the gray scale voltage transmitted by the first data line when the primary switch unit is switched on; the second electrode portion further shares electric charges with a voltage-dividing capacitor when the charge-sharing switch is switched on so as to change the gray scale voltage in the second electrode portion;

wherein at least one of the first electrode portion and the second electrode portion is connected to an extra electrode portion; and each of the first electrode portion, the second electrode portion and the extra electrode portion corresponds to four liquid crystal domains with different liquid crystal pretilt angles.

In one embodiment of the present invention, the liquid crystal display panel is a 3D liquid crystal display panel having a patterned phase retarder film, and the extra electrode portion is shielded by a black matrix.

The present invention further provides another sub-pixel display structure, the sub-pixel display structure is electrically connected to a first data line, a first scanning line and a second scanning adjacent to the first scanning line, and comprises:

a primary switch unit being electrically connected to the first scanning line and the first data line, and the primary switch unit is driven by the first scanning line;

a charge-sharing switch being electrically connected to the second scanning line, and the charge-sharing switch is driven by the second scanning line;

a first electrode portion being electrically connected to the primary switch unit, and the first electrode portion receives a gray scale voltage transmitted by the first data line when the primary switch unit is switched on; and a second electrode portion being electrically connected to the primary switch unit and the charge-sharing switch, wherein the second electrode portion receives the gray scale voltage transmitted by the first data line when the primary switch unit is switched on; the second electrode portion further shares electric charges with a voltage-dividing capacitor when the charge-sharing switch is switched on so as to change the gray scale voltage in the second electrode portion;

wherein the first electrode portion is connected to a first extra electrode portion and electrically connected to the primary switch unit via the first extra electrode portion; the second electrode portion is connected to a second extra electrode portion and electrically connected to the charge-sharing switch via the second extra electrode portion; the first electrode portion, the second electrode portion, the first extra electrode portion and the second extra electrode portion are disposed between the first scanning line and the second scanning line and each of them corresponds to four liquid crystal domains with different liquid crystal pretilt angles.

In one embodiment of the present invention, the ratio of areas of the first electrode portion and the second electrode portion is 3:7 or 4:6.

The present invention is to provide a sub-pixel display structure having a first electrode portion and a second electrode portion, wherein the second electrode portion can share electric charges with a voltage-diving capacitor via a charge-sharing switch, and at least one of the two electrode portions is further connected to an extra electrode portion. When the sub-pixel display structure is implemented in a 3D liquid crystal display panel having a patterned phase retarder film, the manufacturer only needs to use a black matrix to shield the extra electrode portion to satisfy the requirement of 3D viewing angle to lower crosstalk phenomenon of left-eye and right-eye images; in the meantime the first electrode potion and the second electrode portion can remain operatable so that a color washout phenomenon under large viewing angles can also be reduced even when the sub-pixel display structure is used in a 3D liquid crystal display panel.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 4A:
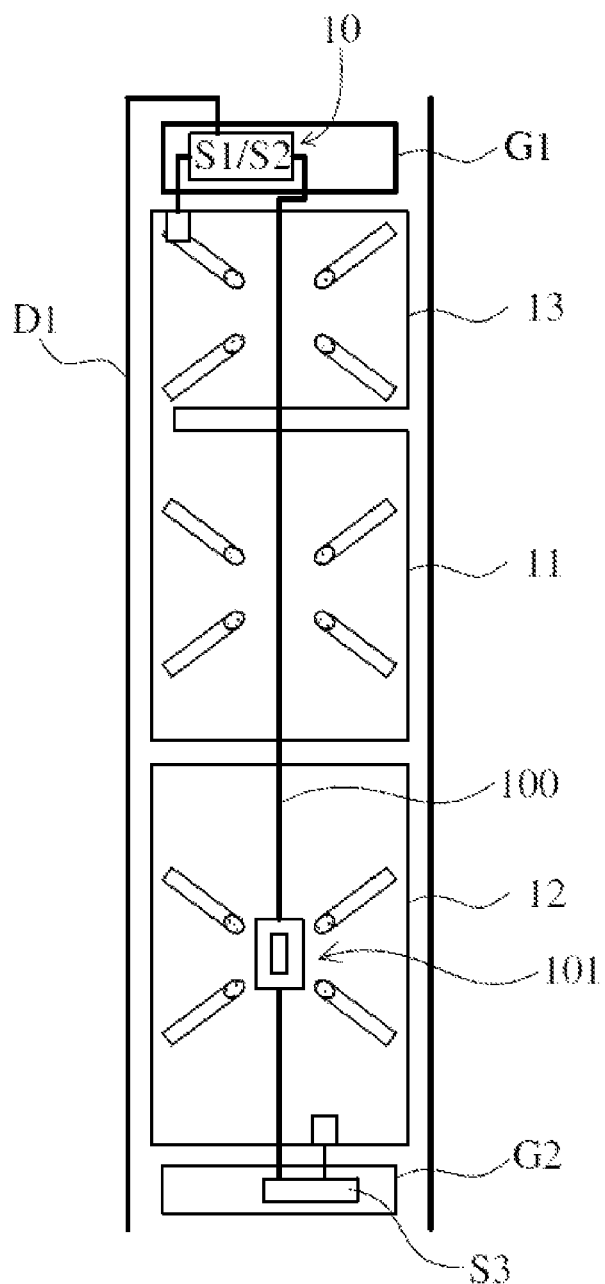
FIG. 4A is a schematic view of a first embodiment of a sub-pixel display structure in accordance with the present invention.

With reference to FIG. 4A, FIG. 4A is a schematic view of a first embodiment of a sub-pixel display structure in accordance with the present invention. The sub-pixel display structure of the present invention can be implemented in a liquid crystal display panel. The liquid crystal display panel may be a 2D liquid crystal display panel or a 3D liquid crystal display panel having a patterned phase retarder film. When the sub-pixel display structure of the present invention is implemented in the liquid crystal display panel, the liquid crystal display panel may include a plurality of scanning lines, a plurality of data lines crossing the scanning lines, and a plurality of said sub-pixel display structures. For the embodiment of FIG. 4A, the scanning lines include a first scanning line G1 and a second scanning line G2 that is adjacent to the first scanning line G1 and the data line includes a first data line D1; wherein one of the sub-pixel display structure is electrically connected to the first scanning line G1 and the second scanning line G2 and the first data line D1. The first scanning line G1 first transmits a scanning signal, and then the second scanning G2 transmit next scanning signal.

With reference to FIG. 4A, the sub-pixel display structure includes a primary switch unit 10, a charge-sharing switch S3, a first electrode portion 11 and a second electrode portion 12.

The primary switch unit 10 is electrically connected to the first scanning line G1 and the first data line D1. The primary switch unit 10 is driven and switched on by the first scanning line G1. In this embodiment, the primary switch unit is composed of a first switch S1 and a second switch S2. The first switch S1 and the second switch S2 are preferably thin-film transistors and mounted on the first scanning line G1 to use the first scanning line G1 as a gate of the first switch S1 and a gate of the second switch; in the meantime a source of the first switch S1 and a source of the second switch S2 are electrically connected to the first data line D1.

The charge-sharing switch S3 is electrically connected to the second scanning line G2. The charge-sharing switch is driven and switched on by the second scanning line G2. In this embodiment, the charge-sharing switch S3 is preferably a thin-film transistor and is mounted on the second scanning line G2 so as to use the second scanning line as a gate of the charge-sharing switch S3; in the meantime a source of the charge-sharing switch S3 is electrically connected to a drain (not shown in the drawing) of the second switch S2 of the primary switch unit 10; a drain of the charge-sharing switch S3 is electrically connected to a voltage-dividing capacitor for performing charge sharing.

The first electrode portion 11 is electrically connected to the primary switch unit 10. The first electrode portion 11 receives a gray scale voltage transmitted by the first data line D1 when the primary switch unit 10 is switched on. In this embodiment, the first electrode portion 11 is electrically connected to the first switch S1 of the primary switch unit 10, and is connected to a drain (not shown in the drawing) of the first switch S1.

The second electrode portion 12 is electrically connected to the primary switch unit 10 and the charge-sharing switch S3. The second electrode portion 12 receives the gray scale voltage transmitted by the first data line D1 when the primary switch unit 10 is switched on. In this embodiment, the second electrode portion 12 is electrically connected to the second switch S2 of the primary switch unit 10, and is connected to a drain (not shown in the drawing) of the second switch S2. And the drain of the second switch S2 is preferably electrically connected to the second electrode portion via a conductive line 100, wherein the conductive line 100 insulatedly extends over the first electrode portion 11 and is connected to the second electrode portion 12 via a through hole 101. The drain of the charge-sharing switch S3 is also electrically connected to the second electrode portion 12 via the through hole 101 and further connected to the drain of the second switch S2 of the primary switch unit 10 via the conductive line 100. In other words, the second electrode portion 12 is electrically connected between the second switch S2 and the charge-sharing switch S3. The second electrode portion 12 further shares electric charges with the voltage-dividing capacitor to which the charge-sharing switch S3 is connected when the charge-sharing switch S3 is switched on so as to change the gray scale voltage which the second electrode portion 12 originally received.

As shown in FIG. 4A, it is worth noting that at least one of the first electrode portion 11 and the second electrode portion 12 is connected to an extra electrode portion 13. And in the embodiment in FIG. 4A, it is the first electrode portion 11 that is connected to an extra electrode portion 13 and the first electrode portion 11 is electrically connected to the primary switch unit 10 via the extra electrode portion 13. Preferably the extra electrode portion 13 and the first electrode portion 11 are integrally formed of a transparent conductive film. Furthermore, each of the first electrode portion 11, the second electrode portion 12 and the extra electrode portion 13 corresponds to four liquid crystal domains with different liquid crystal pretilt angles.

With reference to FIG. 4A, it is worth noting that the first electrode portion 11, the second electrode portion 12 and the extra electrode portion 13 are disposed between the first scanning line G1 and the second scanning line G2. Besides, the first electrode portion 11 and the second electrode portion 12 preferably have a specific area ratio. In this embodiment, the ratio of areas of the first electrode portion 11 and the second electrode portion 12 is 3:7 or 4:6.

When the sub-pixel display structure of the present invention is implemented in a 2D liquid crystal display panel, because the second electrode portion 12 can further share electric charges with the voltage-dividing capacitor to which the charge-sharing switch S3 is connected when the charge-sharing switch S3 is switched on so as to change the gray scale voltage which the second electrode portion 12 originally received, the first electrode portion 11 and the second electrode portion 12 can have different gray scale voltage when displaying images, and thereby effectively improving color washout phenomenon under large viewing angles.

Figure 5A:
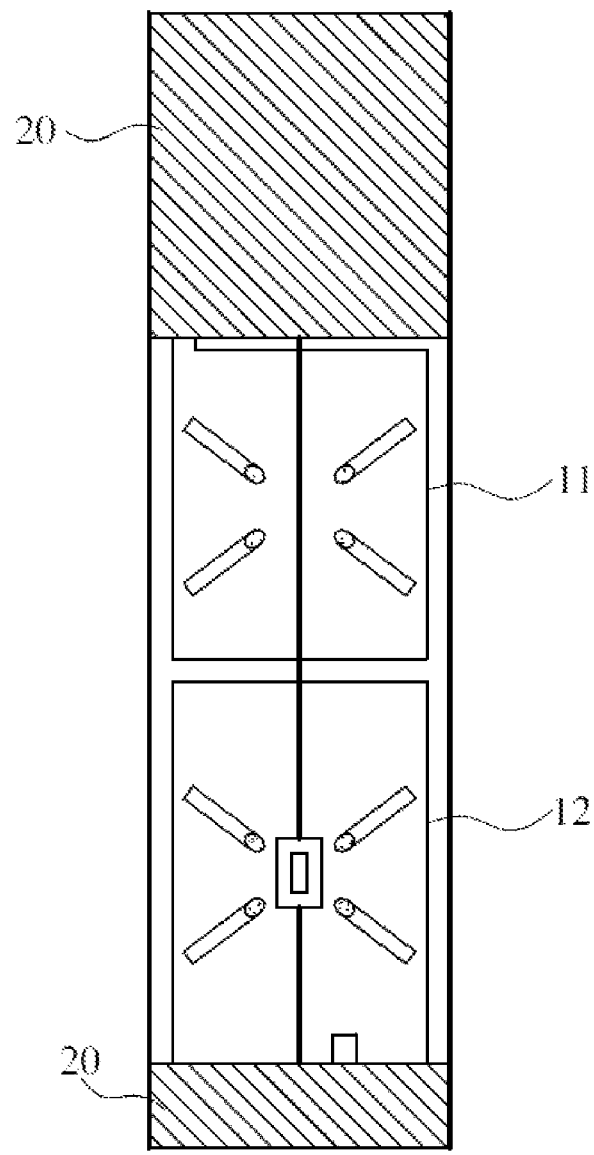
FIG. 5A is a schematic view of the sub-pixel display structure in FIG. 4A when being implemented for 3D display.

Besides, with further reference to FIG. 5A, when the sub-pixel display structure of the present invention is implemented in a 3D liquid crystal display panel which has a patterned phase retarder film, the manufacturer can further dispose a black matrix 20 on a position corresponding to the extra electrode portion 13 to shield the extra electrode portion 13, the first scanning line G1 and the second scanning line G2. In this way, an interval between a sub-pixel structure for displaying left-eye images and a sub-pixel structure for displaying right-eye images can be widened to avoid image crosstalk. Furthermore, the first electrode portion 11 and the second electrode portion 12 still can perform image display under different gray scale voltages via foregoing charge-sharing structure so that the color washout problem under large viewing angles of the 3D liquid crystal display panel having a patterned phase retarder film still can be effectively improved.

Figure 4B:
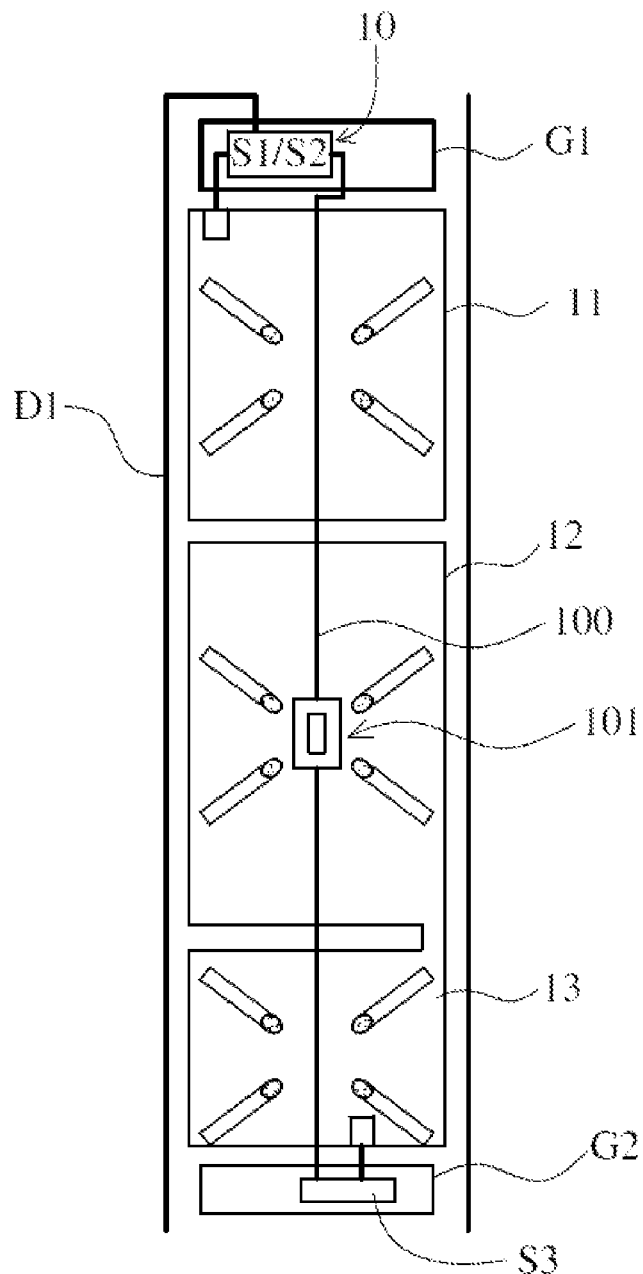
FIG. 4B is a schematic view of a second embodiment of the sub-pixel display structure in accordance with the present invention.

The position and the size of the extra electrode portion may be change based on requirement. For example, please refer to FIG. 4B, FIG. 4B is a schematic view of a second embodiment of the sub-pixel display structure in accordance with the present invention, wherein the second embodiment differ from the first embodiment in FIG. 4A in that: in FIG. 4B, the extra electrode portion 13 is connected to the second electrode portion 12, thus, the second electrode portion 12 is electrically connected to the charge-sharing switch S3 via the extra electrode portion 13. Preferably the extra electrode portion 13 and the second electrode portion 12 are integrally formed of a transparent conductive film. Furthermore, each of the first electrode portion 11, the second electrode portion 12 and the extra electrode portion 13 corresponds to four liquid crystal domains with different liquid crystal pretilt angles.

Figure 5B:
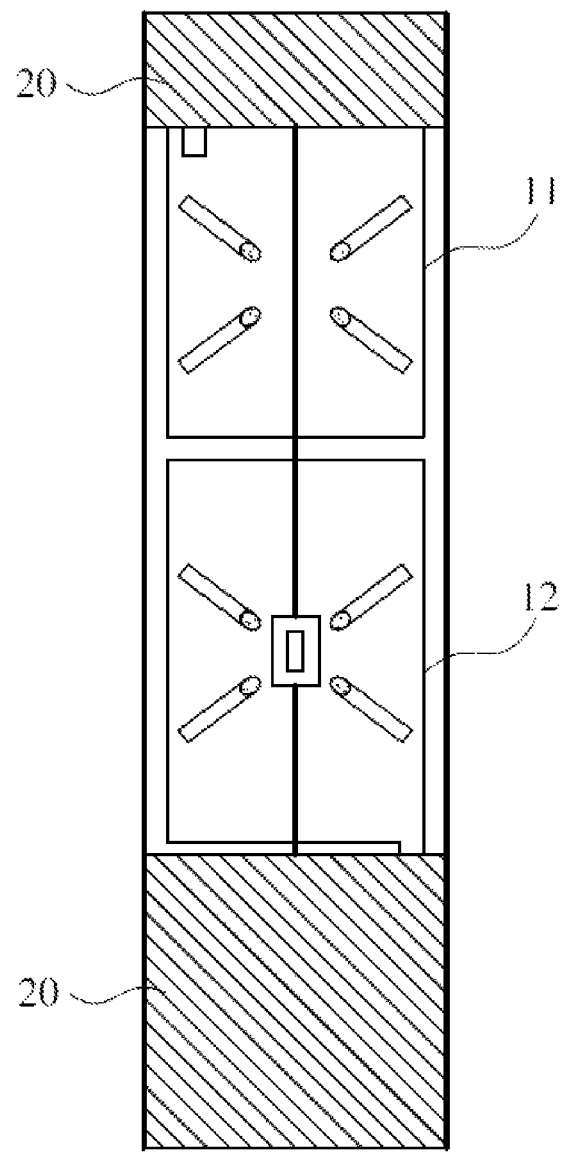
FIG. 5B is a schematic view of the sub-pixel display structure in FIG. 4B when being implemented for 3D display.

Besides, with further reference to FIG. 5B, similarly, when the sub-pixel display structure of the present invention is implemented in a 3D liquid crystal display panel which has a patterned phase retarder film, the manufacturer can further dispose a black matrix 20 on a position corresponding to the extra electrode portion 13 to shield the extra electrode portion 13, the first scanning line G1 and the second scanning line G2 so as to satisfy the requirement of 3D viewing angles. Furthermore, the first electrode portion 11 and the second electrode portion 12 still can perform image display under different gray scale voltages via foregoing charge-sharing structure so that the color washout problem under large viewing angles of the 3D liquid crystal display panel having a patterned phase retarder film still can be effectively improved.

Figure 4C:
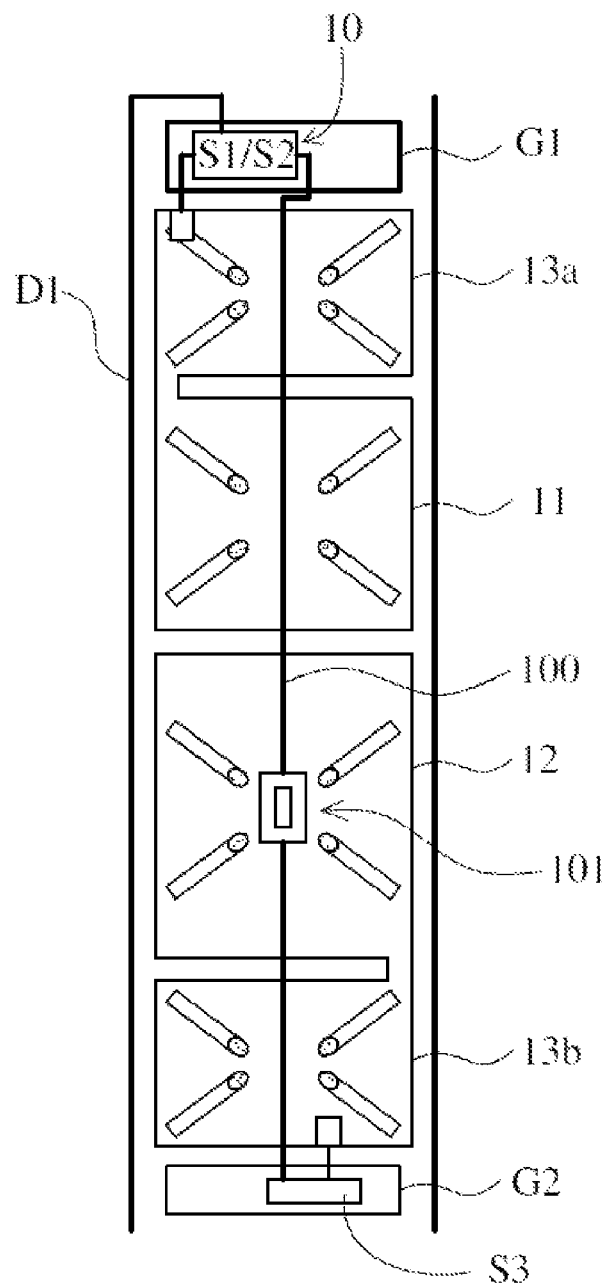
FIG. 4C is a schematic view of a third embodiment of the sub-pixel display structure in accordance with the present invention.

With further reference to FIG. 4C, FIG. 4C is a schematic view of a third embodiment of the sub-pixel display structure in accordance with the present invention. The third embodiment differs from the first embodiment of FIG. 4A and the second embodiment of FIG. 4B in that: in FIG. 4C, the extra electrode portion 13 is divided into a first extra electrode portion 13a and a second extra electrode portion 13b, wherein the first electrode portion 11 is connected to the first extra electrode portion 13a and electrically connected to the primary switch unit 10 via the first extra electrode portion 13a; the second electrode portion 12 is connected to the second extra electrode portion 13b and electrically connected to the charge-sharing switch S3 via the second extra electrode portion 13b. Preferably the first extra electrode portion 13a and the first electrode portion 11 are integrally formed of a transparent conductive film, and preferably the second extra electrode portion 13b and the second electrode portion 12 are integrally formed of a transparent conductive film. Furthermore, each of the first electrode portion 11, the second electrode portion 12, the first extra electrode portion 13a and the second extra electrode portion 13b corresponds to four liquid crystal domains with different liquid crystal pretilt angles.

Figure 5C:
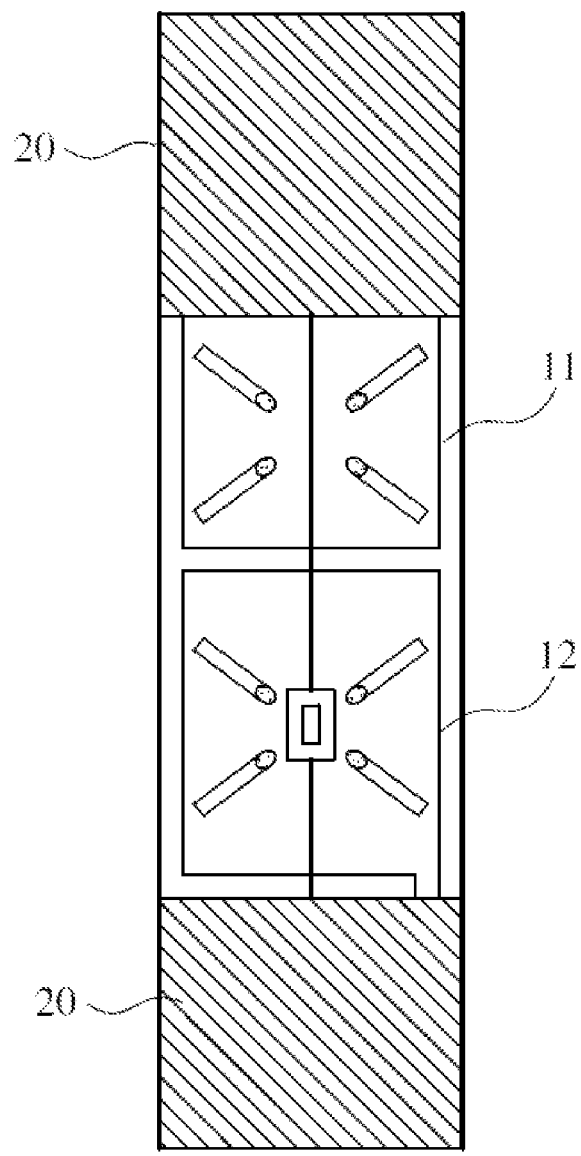
FIG. 5C is a schematic view of the sub-pixel display structure in FIG. 4C when being implemented for 3D display.

With further reference to FIG. 5C, similarly, when the sub-pixel display structure of the present invention is implemented in a 3D liquid crystal display panel which has a patterned phase retarder film, the manufacturer can further dispose a black matrix 20 on positions corresponding to the first extra electrode portion 13a and the second extra electrode portion 13b to shield the first extra electrode portion 13a, the second extra electrode portion 13b, the first scanning line G1 and the second scanning line G2 so as to satisfy the requirement of 3D viewing angles. Furthermore, the first electrode portion 11 and the second electrode portion 12 still can perform image display under different gray scale voltages via foregoing charge-sharing structure so that the color washout problem under large viewing angles of the 3D liquid crystal display panel having a patterned phase retarder film still can be effectively improved.

Figure 1:
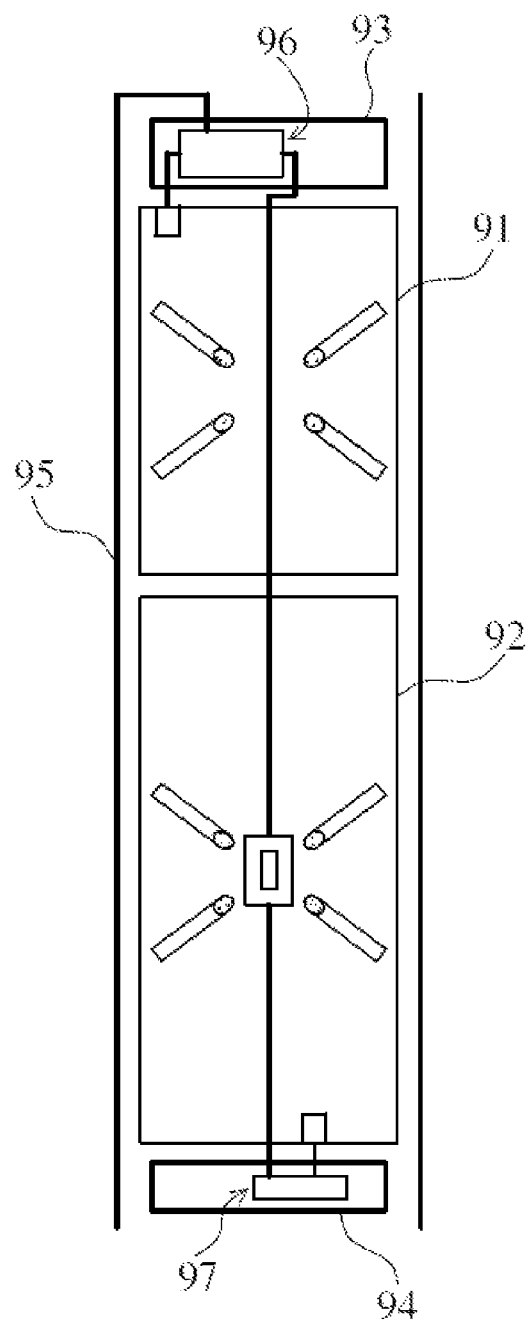
FIG. 1 is a schematic view of a sub-pixel display structure of a conventional liquid crystal display device.
Figure 2:
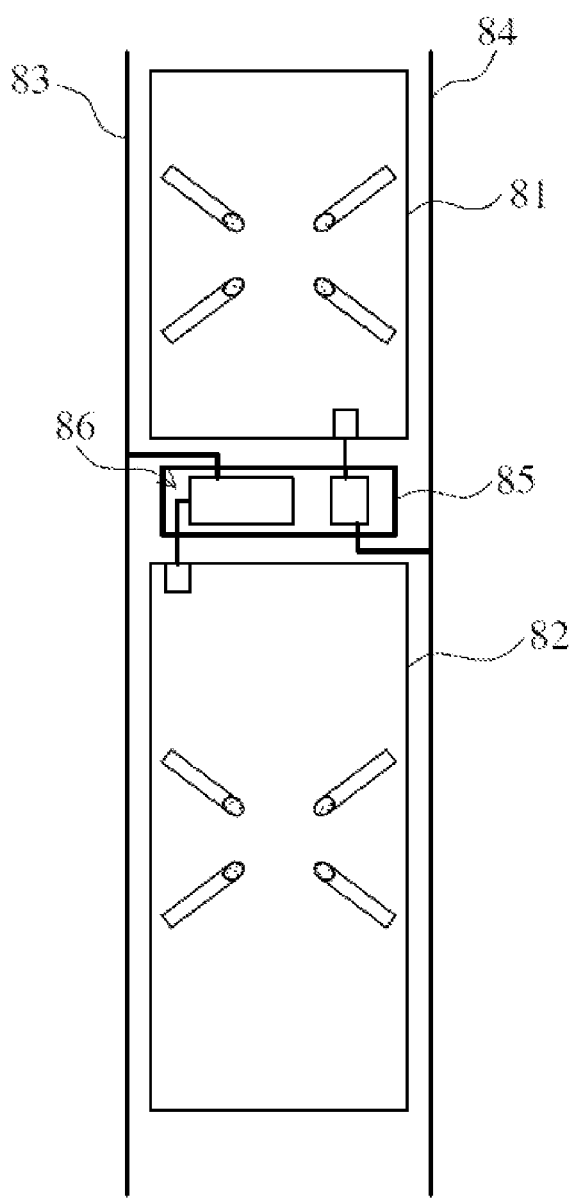
FIG. 2 is a schematic view of another sub-pixel display structure of a conventional liquid crystal display device.
Figure 3:
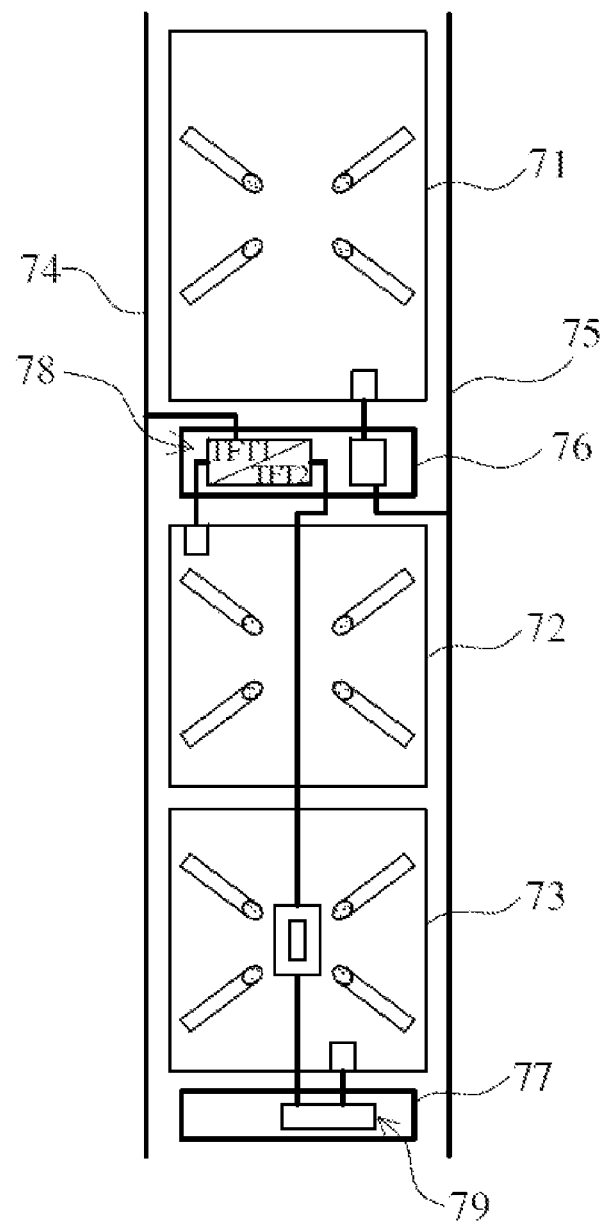
FIG. 3 is a schematic view of still another sub-pixel display structure of a conventional liquid crystal display device.

By the above description, the present invention is to provide a sub-pixel display structure having a first electrode portion and a second electrode portion, wherein the second electrode portion can share electric charges with a voltage-diving capacitor via a charge-sharing switch, and at least one of the two electrode portions is further connected to an extra electrode portion. When the sub-pixel display structure is implemented in a 3D liquid crystal display panel having a patterned phase retarder film, the manufacturer only needs to use a black matrix to shield the extra electrode portion to satisfy the requirement of 3D viewing angle to lower crosstalk phenomenon of left-eye and right-eye images; in the meantime the first electrode potion and the second electrode portion can remain operatable so that a color washout phenomenon under large viewing angles can also be reduced even when the sub-pixel display structure is used in a 3D liquid crystal display panel. Besides, the sub-pixel display structure of the present invention only needs to be connected to one data line to achieve the objective of improving color washout problem under large viewing angles. Comparing with the sub-pixel display structure in FIG. 3 that uses two data lines at the same time, the present invention can relatively reduce the usage of data driving chip (source driving chip) to further reduce the manufacturing cost and power consumption of the liquid crystal display panel.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A sub-pixel display structure being connected to a first data line, a first scanning line and a second scanning line adjacent to the first scanning line, and comprising:
    a primary switch unit being electrically connected to the first scanning line and the first data line, and the primary switch unit is driven by the first scanning line;
    a charge-sharing switch being electrically connected to the second scanning line, and the charge-sharing switch is driven by the second scanning line;
    a first electrode portion being electrically connected to the primary switch unit, and the first electrode portion receives a gray scale voltage transmitted by the first data line when the primary switch unit is switched on; and
    a second electrode portion being electrically connected to the primary switch unit and the charge-sharing switch, wherein the second electrode portion receives the gray scale voltage transmitted by the first data line when the primary switch unit is switched on; the second electrode portion further shares electric charges with a voltage-dividing capacitor when the charge-sharing switch is switched on so as to change the gray scale voltage in the second electrode portion; the second electrode portion and the first electrode portion are adjacent to each other;
    wherein the first electrode portion is connected to a first extra electrode portion and electrically connected to the primary switch unit via the first extra electrode portion; the second electrode portion is connected to a second extra electrode portion and electrically connected to the charge-sharing switch via the second extra electrode portion; the first electrode portion, the second electrode portion, the first extra electrode portion and the second extra electrode portion are disposed between the first scanning line and the second scanning line and each of them corresponds to four liquid crystal domains with different liquid crystal pretilt angles.

2. The sub-pixel display structure as claimed in claim 1, wherein the ratio of areas of the first electrode portion and the second electrode portion is 3:7 or 4:6.

3. A sub-pixel display structure being electrically connected to a first data line, a first scanning line and a second scanning line adjacent to the first scanning line, and comprising:
    a primary switch unit being electrically connected to the first scanning line and the first data line, and the primary switch unit is driven by the first scanning line;
    a charge-sharing switch being electrically connected to the second scanning line, and the charge-sharing switch is driven by the second scanning line;
    a first electrode portion being electrically connected to the primary switch unit, and the first electrode portion receives a gray scale voltage transmitted by the first data line when the primary switch unit is switched on; and
    a second electrode portion being electrically connected to the primary switch unit and the charge-sharing switch, wherein the second electrode portion receives the gray scale voltage transmitted by the first data line when the primary switch unit is switched on; the second electrode portion further shares electric charges with a voltage-dividing capacitor when the charge-sharing switch is switched on so as to change the gray scale voltage in the second electrode portion; the second electrode portion and the first electrode portion are adjacent to each other;
    wherein at least one of the first electrode portion and the second electrode portion is connected to an extra electrode portion; and each of the first electrode portion, the second electrode portion and the extra electrode portion corresponds to four liquid crystal domains with different liquid crystal pretilt angles.

4. The sub-pixel display structure as claimed in claim 3, wherein the first electrode portion, the second electrode portion and the extra electrode portion are disposed between the first scanning line and the second scanning line.

5. The sub-pixel display structure as claimed in claim 3, wherein the first electrode portion is connected to an extra electrode portion and electrically connected to the primary switch unit via the extra electrode portion.

6. The sub-pixel display structure as claimed in claim 3, wherein the second electrode portion is connected to an extra electrode portion and electrically connected to the charge-sharing switch via the extra electrode portion.

7. The sub-pixel display structure as claimed in claim 3, wherein the first electrode portion is connected to a first extra electrode portion and electrically connected to the primary switch unit via the first extra electrode portion; and the second electrode portion is connected to a second extra electrode portion and electrically connected to the charge-sharing switch via the second extra electrode portion.

8. The sub-pixel display structure as claimed in claim 7, wherein each of the first electrode portion, the second electrode portion, the first extra electrode portion and the second extra electrode portion corresponds to four liquid crystal domains with different liquid crystal pretilt angles.

9. The sub-pixel display structure as claimed in claim 3, wherein the ratio of areas of the first electrode portion and the second electrode portion is 3:7 or 4:6.

10. The sub-pixel display structure as claimed in claim 3, wherein the primary switch unit is composed of two switches; the first electrode portion is electrically connected to one of the switches of the primary switch unit; and the second electrode portion is electrically connected to the other one of the switches of the primary switch unit.

11. A liquid crystal display panel comprising:
    a plurality of scanning lines including a first scanning line and a second scanning line that are adjacent to each other;
    a plurality of data lines crossing the scanning lines and including a first data line;
    a plurality of sub-pixel display structures, wherein one of the sub-pixel display structures is electrically connected to the first data line, the first scanning line and the second scanning line adjacent to the first scanning line, and comprises:

a primary switch unit being electrically connected to the first scanning line and the first data line, and the primary switch unit is driven by the first scanning line;

a charge-sharing switch being electrically connected to the second scanning line, and the charge-sharing switch is driven by the second scanning line;

a first electrode portion being electrically connected to the primary switch unit, and the first electrode portion receives a gray scale voltage transmitted by the first data line when the primary switch unit is switched on; and a second electrode portion being electrically connected to the primary switch unit and the charge-sharing switch, wherein the second electrode portion receives the gray scale voltage transmitted by the first data line when the primary switch unit is switched on; the second electrode portion further shares electric charges with a voltage-dividing capacitor when the charge-sharing switch is switched on so as to change the gray scale voltage in the second electrode portion; the second electrode portion and the first electrode portion are adjacent to each other;

wherein at least one of the first electrode portion and the second electrode portion is connected to an extra electrode portion; and each of the first electrode portion, the second electrode portion and the extra electrode portion corresponds to four liquid crystal domains with different liquid crystal pretilt angles.

12. The sub-pixel display structure as claimed in claim 11, wherein the liquid crystal display panel is a 3D liquid crystal display panel having a patterned phase retarder film, and the extra electrode portion is shielded by a black matrix.

* * * * *